(12) United States Patent
Lovsen et al.

(10) Patent No.: US 10,021,038 B2
(45) Date of Patent: Jul. 10, 2018

(54) SHARING RESOURCE RESERVATION

(71) Applicant: TELEFONAKTIEBOLAGET L M ERICSSON (PUBL), Stockholm (SE)

(72) Inventors: Lars Lovsen, Gothenburg (SE); Rikard Eriksson, Jorlanda (SE); Fredrik Lindholm, Stockholm (SE); Maria Belen Pancorbo Marcos, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 924 days.

(21) Appl. No.: 14/280,326

(22) Filed: May 16, 2014

(65) Prior Publication Data
US 2014/0344472 A1 Nov. 20, 2014

Related U.S. Application Data

(60) Provisional application No. 61/824,611, filed on May 17, 2013.

(51) Int. Cl.
*H04L 12/911* (2013.01)
*H04W 4/16* (2009.01)

(52) U.S. Cl.
CPC ............... *H04L 47/72* (2013.01); *H04W 4/16* (2013.01)

(58) Field of Classification Search
CPC .................................. H04W 4/16; H04L 47/72
See application file for complete search history.

(56) References Cited

U.S. PATENT DOCUMENTS

2007/0280289 A1* 12/2007 Konda ................. H04L 47/724 370/468
2009/0310487 A1* 12/2009 Eriksson ................ H04L 47/10 370/235
2013/0114408 A1* 5/2013 Sastry .................. H04W 28/02 370/231
2014/0254476 A1* 9/2014 Blankenship ........... H04L 47/20 370/328
2015/0009826 A1* 1/2015 Ma ..................... H04W 28/0268 370/235

FOREIGN PATENT DOCUMENTS

CN WO2011134319 * 11/2011 ............. H04L 41/50
CN WO2012159321 * 11/2012 ............. H04W 28/24

OTHER PUBLICATIONS

MathWorks; Mar. 18, 2013 "Max-Maximum Numbers" retrieved on Apr. 20, 2917 from <https://www.mathworks.com/help/symbolic/mupad_ref/max.html>.*

* cited by examiner

*Primary Examiner* — Tauqir Hussain
*Assistant Examiner* — Juan C Turriate Gastulo
(74) *Attorney, Agent, or Firm* — Rothwell, Figg, Ernst & Manbeck, p.c.

(57) ABSTRACT

A method in a first network node handles data sessions in a communications network. The method includes receiving information indicating a second data session entering the communications network. The method further includes creating a second rule associated with the second data session. The second rule causes the first data session to be associated with the second data session. The method further includes determining that the second rule share a guaranteed bit rate (GBR) with a first rule associated with the first data session based on the second data session entering the communications network. The method further includes transmitting first information that the second rule and an indicator indicating the first rule and the second rule should share the GBR.

12 Claims, 9 Drawing Sheets

SHARING RESOURCE RESERVATION

CROSS REFERENCE TO RELATED APPLICATION(S)

This application claims the benefit of U.S. Provisional Application No. 61/824,611, filed May 17, 2013. The disclosure of the referenced application is incorporated herein in its entirety by reference.

TECHNICAL FIELD

Embodiments herein relate generally to a first network node and a second network node.

More particularly the embodiments herein relate to sharing resource reservation at Internet protocol Multimedia Subsystem (IMS) call waiting and/or call hold.

BACKGROUND

In a typical communications network, a device communicates via a Radio Access Network (RAN) to one or more Core Networks (CNs). The communications network may also be referred to as a wireless communications network, a wireless communications system, a communications network, a communications system, a network or a system, etc.

A subscriber may use the device to access services offered by an operator's network and services outside the operator's network to which the operator's radio access network and core network provide access (e.g., access to the Internet). The device may be any device, mobile or stationary, enabled to communicate over a radio channel in the communications network, for instance but not limited to user equipment, a mobile phone, a smart phone, sensors, meters, vehicles, household appliances, medical appliances, media players, cameras, Machine to Machine (M2M) device, a television, a radio, lighting arrangements, a tablet computer, laptop, a personal computer (PC), or any other type of device. The device may be portable, pocket storable, hand held, computer comprised, a vehicle mounted device that is enabled to communicate voice and/or data, via the radio access network, with another entity, such as another device or a server. The device may also be a wireless device.

The communications network covers a geographical area which is divided into cell areas. Each cell area is served by a base station. The base station may be referred to as a Radio Base Station (RBS), evolved Node B (eNB), eNodeB, NodeB, B node or Base Transceiver Station (BTS), etc., depending on the technology and terminology used. The base stations communicate over the air interface by operating at radio frequencies within range of the base stations.

IP multimedia core network subsystems (IMS) is an architectural framework for delivering IP multimedia service. A device may connect to IMS via fixed access (e.g., wired), mobile access or wireless access. The IMS comprises all core network elements for provision of multimedia services and is a collection of different functions, linked by interfaces. One or more functions may be combined in one network node, or a single function may be split into two or more network nodes. Each network node can also be present multiple times in a single network. IMS enables Public Land Mobile Network (PLMN) operators to offer their subscribers multimedia services based on and built upon Internet applications, services and protocols. The complete solution for the support of IP multimedia applications comprises devices, IP-Connectivity Access Networks (IP-CAN), and specific functional elements/functions of the IP multimedia core network subsystem.

The IMS comprises a Home Subscriber Server (HSS), or User Profile Server Function (UPSF). The UPSF is a user database that supports the IMS network entities that actually handle calls. A Call Session Control Function (CSCF) provides processing of SIP signaling packets in the IMS. There are several types of CSCF, such as e.g. Proxy-CSCF (P-CSCF), Serving-CSCF (S-CSCF) and Interrogating-CSCF (I-CSCF). The system also comprises application and media servers, a breakout gateway, and media resources.

Policy and Charging Control (PCC) is an important feature in a communications network. The PCC comprises a Policy and Charging Rules Function (PCRF) which provides policy control and flow based charging control decisions; and a Policy and Charging Enforcement Function (PCEF) implemented in a GateWay (GW) which enforces gating and Quality of Service (QoS) for individual IP flows according to PCC rules on the behalf of the PCRF; and provides usage measurement to support charging. Gx is the reference point between PCRF and PCEF and Rx is the reference point is between an Application Function (AF) and the PCRF.

A PCC rule comprises information necessary for enabling detection of a service data flow and providing parameters for policy control and/or charging control. A PCC rule may be dynamic or predefined. The dynamic PCC rule is provisioned by the PCRF via the Gx reference point. The predefined PCC is directly provisioned into the PCEF and only referenced by the PCEF.

Present methods for resource reservation with the 3rd Generation Partnership Project (3GPP) PCC framework supports that a service can get specific Guaranteed Bit Rate (GBR) resources specifically reserved. Describing the service in terms of packet filters identifies which data packets are part of the service. There is a GBR value (one for each direction) associated with those filters in order to express the demand for a GBR. Admission control procedures assure that enough resources are set aside for that data flow.

For a service layer, like IMS, there is an occasional need to run two or more mutually exclusive instances of the same kind of service and to quickly toggle between them in case of call waiting, call hold and call switching. Resources are exclusively reserved for each call. Examples of services are voice and video. When, for example, a resource reservation request for the second voice call arrives at the PCRF, resources for that call will be allocated even though only one of the calls are active while the other call is on hold or is waiting. Thus, an unnecessary large amount of radio resources are allocated. A service layer, as mentioned above, is a conceptual layer within a network service provider architecture which serves third-party value-added services and applications at a higher application layer. The service layer also provides an interface to core networks at a lower resource layer. The lower layers may be a control layer and/or a transport layer. The service layer of an IMS architecture provides multimedia services to the overall IMS network. In addition to IMS, the concept of service layer is used in other contexts such as Intelligent Networks (IN), Wireless Application Protocol (WAP) and Third Generation (3G).

The 3GPP PCC architecture accepts authorizations for media and their QoS demand over the Rx reference point. Each media has a separate authorization and obtains its own GBR resource reserved for that particular media.

For services that are mutually exclusive, the PCC framework offers no possibility to share the full or parts of the reserved resources between the mutually exclusive services, provided that other policy aspects like gating, identification of usage data for offline charging, etc., are still to be handled separately for each service. In particular, gating may be of importance to assist the application layer to ensure the services are mutually exclusive.

FIG. 1 illustrates embodiments of a method. A QCI-1 bearer with resources for a first call is reserved. Then, a second resource reservation is done from the P-CSCF when the next call is setup. As the same QCI and ARP will be used, a modification of existing bearer can be performed. However, for the new resources (which is a separate Rx session), the request from PCRF will use a different "Charging-Rule-Name AVP". As a result, the PCEF will ADD the new resources requested on top of already allocated resources rather than update current resources. Thus, Call waiting, Call Hold, and Conferencing may today create double (and in some cases triple) resource reservation in the network. In all these cases, the user will only have one active call, the other session will be on hold. Still, dedicated resources will be allocated also for sessions where media is not sent/received. This leads to a waste of resources in the network, and requires over-dimensioning of the LTE cells. This may become a long term problem for populated areas, and in particular in areas with a large concentration of, e.g., business users, where an over-dimensioning will then be required.

SUMMARY

In an aspect of the invention, a method in a first network node for handling data sessions in a communications network. The method includes receiving information indicating a second data session entering the communications network. The method further includes creating a second rule associated with the second data session. The second rule causes the first data session to be associated with the second data session. The method further includes determining that the second rule share a guaranteed bit rate (GBR) with a first rule associated with the first data session based on the second data session entering the communications network. The method further includes transmitting first information that the second rule and an indicator indicating the first rule and the second rule should share the GBR.

In another aspect of the invention, a method in a second network node for handling data sessions in a communications network. The first data session associated with a first rule is on-going in the communications network and the second network node creates a bearer for the first data session. The method includes receiving, from the first network node, information indicating a second rule associated with a second data session entering the communications network and an indicator indicating that the first rule and the second rule share GBR. The method further includes determining the shared GBR by selecting the largest of the GBR of the first rule and the GBR of the second rule. The method further includes modifying the bearer created for the first data session to apply the shared GBR.

In another aspect of the invention, a device includes a processor and a computer readable medium coupled to the processor, the computer readable medium contains instructions executed by the processor. The device is in a first network node handles data sessions in a communications network. The first data session is on-going in the communications network. The device is operative to receive information that a second data session enters the communication network. The device is operative to create a second rule associated with the second data session. The second rule causes the first data session to be associated with the second data session. The device is operative to determine that the second rule share a GBR with a first rule associated with the first data session based on the second data entering the communications network. The device is operative to transmit first information that the second rule and the indicator indicating that the first rule and the second rule share the GBR. The device is operative to determine a shared maximum bit rate (MBR) between the first rule and the second rule. The device is operative to transmit other information regarding the shared MBR to the second network node.

In another aspect of the invention, a device includes a processor and a computer readable medium coupled to the processor, the computer readable medium contains instructions executed by the processor. The device is in a second network node handles data sessions in a communications network. The first data session associated with a first rule is on-going in the communications network and the second network node creates a bearer for the first data session. The device is operative to receive, from the first network node, information indicating a second rule associated with a second data session entering the communications network and an indicator indicating that the first rule and the second rule share GBR. The device is operative to determine the shared GBR by selecting the largest of the GBR of the first rule and the GBR of the second rule. The device is operative to modify the bearer created for the first data session to apply the shared GBR.

An objective of embodiments herein is therefore to obviate at least one of the above disadvantages and to provide improved utilization of radio resources in a communications network. Since the shared GBR is determined and co-used by all rules, only the necessary amount of radio resources is allocated, and, thus, the utilization of radio resources in the communications network is improved. Embodiments herein afford many advantages, of which a non-exhaustive list of examples follows: The embodiments herein provide the PCRF with accurate control over the GBR allocation to different services, and still allowing the application layer to share the same reservation for flows, where each of them might fill the whole GBR reservation. Techniques, like application layer control and/or gating may be applied to ensure that one and only one of the services generates traffic that is let through to the PCEF at any point in time. Another advantage of the embodiments described herein is that only the necessary radio resources are allocated.

The embodiments described herein are not limited to the features and advantages mentioned above. A person skilled in the art will recognize additional features and advantages upon reading the following detailed description.

BRIEF DESCRIPTION OF THE DRAWINGS

The embodiments described herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

This invention relates to a 3GPP radio resource management using the 3GPP QoS concepts, allowing the reservation of a shared reserved radio resource for multiple services.

Figure 2:
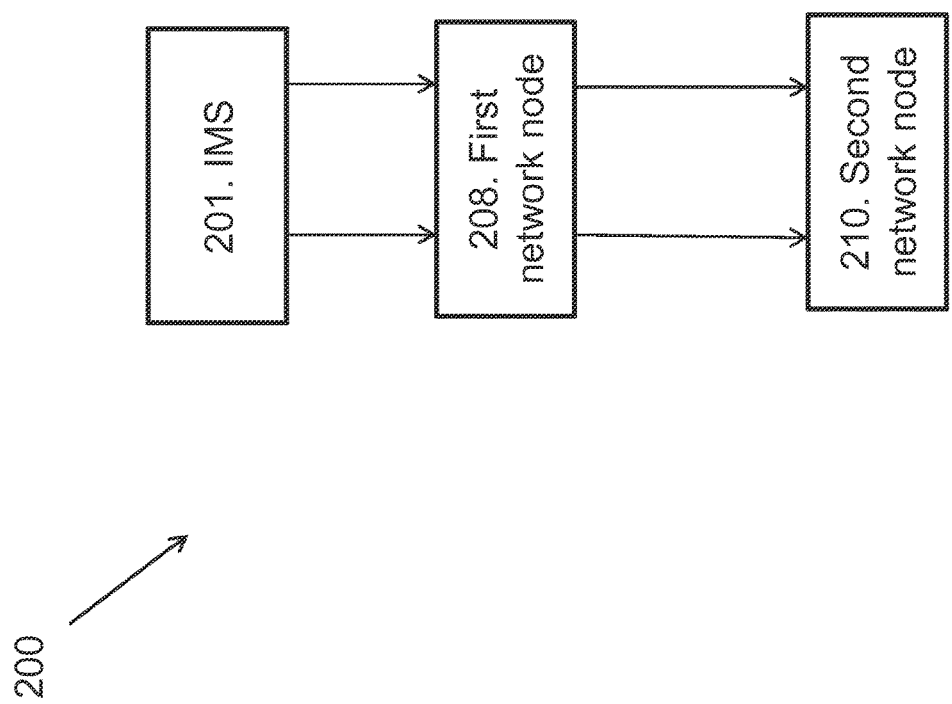
FIG. 2 is an example schematic block diagram illustrating embodiments of a communications network.

FIG. 2 depicts a communications network 200 in which embodiments described herein may be implemented. The communications network 200 may in some embodiments apply to one or more radio access technologies that are second Generation (2G), third Generation (3G) or fourth Generation (4G), such as for example Long Term Evolution (LTE), LTE Advanced, Wideband Code Division Multiple Access (WCDMA), CDMA2000, Global System for Mobile Communications (GSM), WiFi, WiMax, or any other Third Generation Partnership Project (3GPP) radio access technology or other radio access technologies such as WLAN. The communications network 200 is also applicable to fixed broadband access.

The communications network 200 comprises but is not restricted to an IP Multimedia Subsystem (IMS) 201 delivering IP multimedia service to at least one device (not shown). The device may be a device by which a subscriber may access services offered by an operator's network and services outside the operator's network to which the operator's radio access network and core network provide access, e.g. access to the Internet. The device may be any device, mobile or stationary, enabled to communicate over a radio channel in the communications network. Non-limiting examples of a device include user equipment, a mobile phone, a smart phone, sensors, meters, vehicles, household appliances, medical appliances, media players, cameras, a Machine to Machine (M2M) device, a television, a radio, lighting arrangements, a tablet computer, a laptop or a personal computer (PC). The device may be portable, pocket storable, hand held, computer comprised, vehicle mounted devices, or enabled to communicate voice and/or data, via the radio access network, with another entity, such as another device or a server.

The IMS 201 is connected to a first network node 208. The first network node 208 is connected to a second network node 210. The first network node 208 may be, e.g., a PCRF and the second network node 210 may be a Gateway General packet radio service Support Node (GGSN) or a Packet data network GateWay (PGW) implementing a PCEF.

It should be noted that the links between the nodes of the communications network 200 may be any wired or wireless link. The link may use any suitable protocol depending on type and level of layer (e.g. as indicated by the OSI model) as understood by a person skilled in the art.

Figure 3:
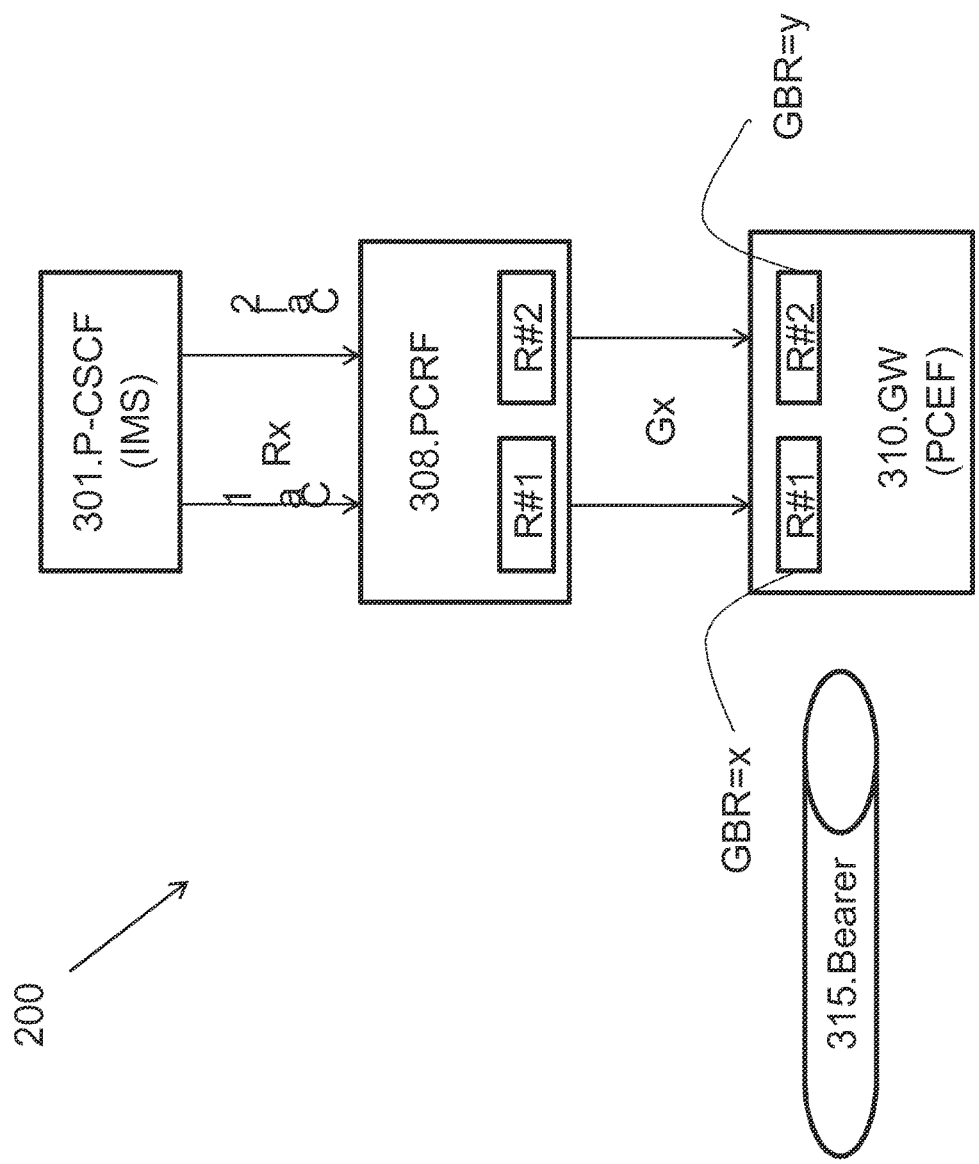
FIG. 3 is an example schematic block diagram illustrating embodiments of a communications network.

FIG. 3 depicts an embodiment of the communications network 200. The communications network comprises a P-CSCF 301. The P-CSCF 301 is an Application Function (AF), as seen from the PCC architecture framework perspective, and is the node in IMS that interacts with the packet core via the Rx interface. The P-CSCF 301 is the entry point to the IMS domain and serves as the proxy server for the IMS client. The IMS client uses a communications device for communication towards the IMS network. The P-CSCF 301 is responsible for routing Session Initiation Protocol (SIP) messages to and from the IMS client and for facilitating resource reservation and other call control over the Rx interface towards the PCRF 308. The P-CSCF 301 is also responsible for setting up IPSec Security associations with the devices and ensuring secure access to the IMS core if required.

The PCRF 308 in FIG. 3 represents the first network node 208 in FIG. 2. According to the 3GPP, the PCRF 308 is a functional element that encompasses policy control decision and flow based charging control functionalities. The PCRF 308 provides network control regarding the service data flow and application's traffic detection, gating, QoS and flow based charging towards the PCEF 310. The PCRF 308 receives session and media related information from the P-CSCF 301 and informs P-CSCF 301 of traffic plane events. The PCRF 308 shall provision PCC Rules to the PCEF 310 via the Gx reference point. The PCRF 308 shall inform the PCEF 310 through the use of PCC rules on the treatment of each service data flow that is under PCC control, in accordance with the PCRF policy decisions.

The PCEF 310 in FIG. 3 represents the second network node 210 in FIG. 2. The PCEF 310 is located in a gateway, such as for example a PGW or a GGSN. According to the 3GPP, the PCEF 310 is the functional element that encompasses policy enforcement and flow based charging functionalities. The PCEF 310 provides control over the user plane traffic handling at the gateway and its QoS, and provides service data flow detection and counting as well as online and offline charging interactions. For a service data flow that is under charging control the PCEF 310 shall allow the service data flow to pass through the gateway if and only if there is a corresponding active PCC rule. Thus, the PCEF 310 sets up bearers 315 for the incoming sessions.

Figure 4:
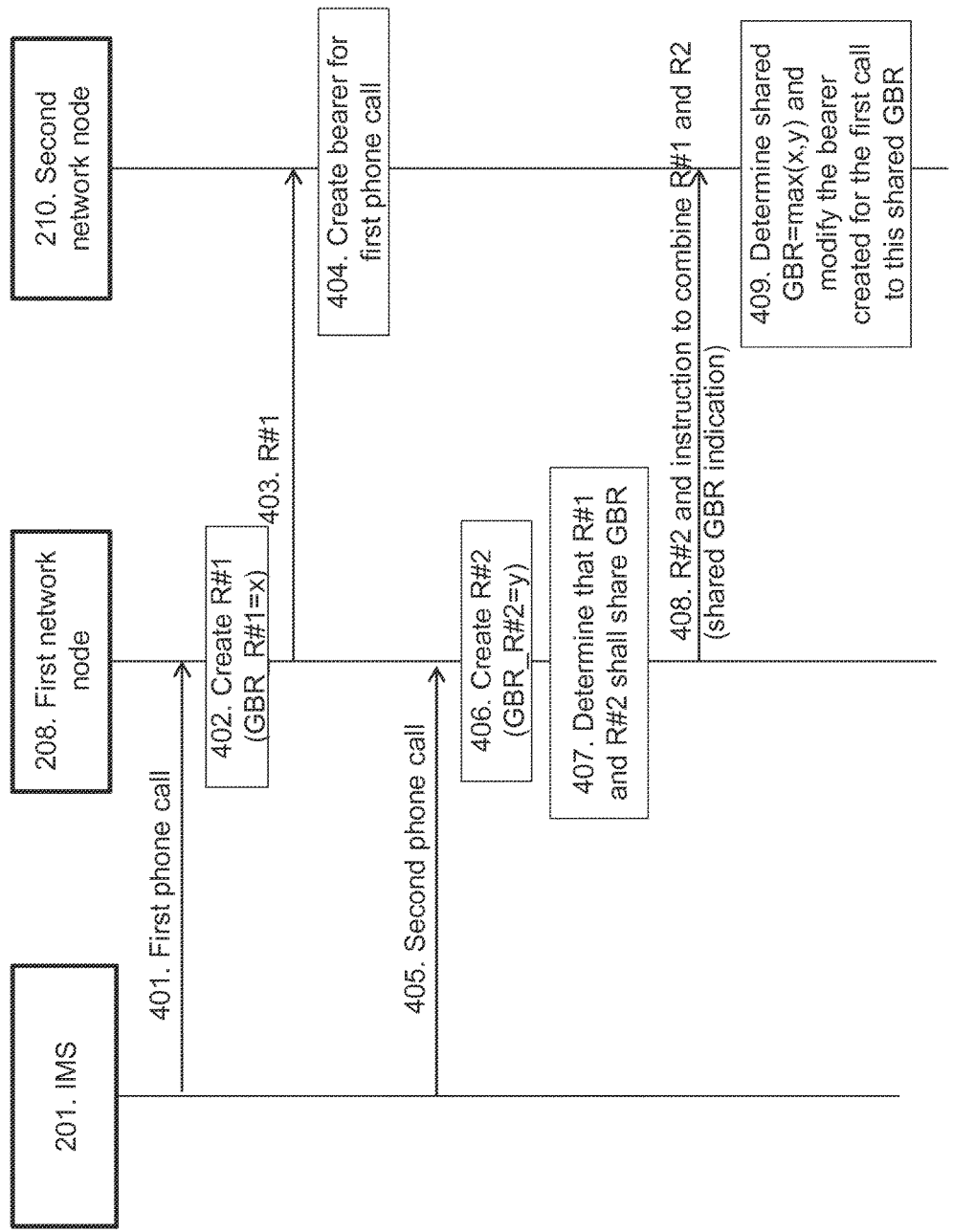
FIG. 4 is an example signaling diagram illustrating embodiments of a method in a communications network.

The method for enabling sharing resource reservation, according to some embodiments will now be described with reference to the signaling diagram depicted in FIG. 4 with reference to FIG. 3. In FIG. 4, a phone call between two devices, i.e. IMS clients, represent a session. However, any other type of session, such as e.g. a video session, is also applicable.

The phone call may also be referred to as a flow in the following description. A call for voice comprises a two two-way communications, i.e., Real-time Transport Protocol (RTP) for the "sound" and RTP Control Protocol (RTCP) for controlling the follow. The RTP and RTCP are associated with different PCC rules since they have different needs with regards to gating. In this document, the term flow refers to the RTP. The example in FIG. 4 illustrates two IMS sessions, where one device is involved in both sessions. The RTP defines a standardized packet format for delivering audio and video over IP networks. RTP is used in conjunction with the RTCP. While RTP carries the media streams (e.g., audio and video), RTCP is used to monitor transmission statistics and QoS and aids synchronization of multiple streams.

Even though FIG. 4 describes a first and second phone call, the skilled person will understand that the figure is also applicable to any number of phone calls larger than two. The method comprises the following steps, which steps may as well be carried out in another suitable order than described below.

Step 401

The IMS 201 receives a first incoming phone call from one device and sends session and media related information associated with the first phone call to the first network node 208. The session and media related information indicates the resources the IMS 201 wants to reserve for this call, i.e., authorization for the media.

Step 402

The first network node 208 creates a first PCC rule R#1 for the first phone call, based on the information received in step 401. This also involves determining the resources and the GBR for the first phone call (e.g., GBR=x, where x is any positive integer). The first PCC rule R#1 also comprises the actual description of the media, i.e., a pattern describing how to find the packet, 3GPP-term service data flow filters, etc.

A PCC rule comprises the following parameters in Table 1 and as defined in the 3GPP TS 23.203:

TABLE 1

| Parameter | Definition |
| --- | --- |
| Rule identifier | Uniquely identifies the PCC rule, within an IP CAN session. It is used between the first network node 208 and the second network node 210 for referencing PCC rules. |
| QoS class identifier | Identifier for the authorized QoS parameters for the service data flow. |
| UL-maximum bitrate | The UpLink (UL) maximum bitrate authorized for the service data flow. |
| DL-maximum bitrate | The DownLink (DL) maximum bitrate authorized for the service data flow. |
| UL-guaranteed bitrate | The uplink guaranteed bitrate authorized for the service data flow. |
| DL-guaranteed bitrate | The downlink guaranteed bitrate authorized for the service data flow. |
| ARP | The Allocation and Retention Priority (ARP) for the service data flow comprising the priority level, the pre-emption capability and the pre-emption vulnerability. |

The service data flow mentioned in Table 1 above represents the packets which are detected by using service data flow filters which are comprised in the rule. They are to be handled with a QCI. The packets are the ones that pass on the voice media. Table 1 is an extract from Table 2.

The Gx (3GPP TS 29.212) syntax for the PCC rule definition has legacy Attribute Value Pairs (AVPs):

```
Charging-Rule-Definition ::= < AVP Header: 1003 >
    { Charging-Rule-Name }
    ...
    [ QoS-Information ]
    ...
    * [ AVP ]
```

The QoS information associated with R#1 is as follows:

```
QoS-Information ::= < AVP Header: 1016 >
    [ QoS-Class-Identifier ]
    [ Max-Requested-Bandwidth-UL ]
    [ Max-Requested-Bandwidth-DL ]
    [ Guaranteed-Bitrate-UL ]
    [ Guaranteed-Bitrate-DL ]
    [ Bearer-Identifier ]
    [ Allocation-Retention-Priority]
    [ APN-Aggregate-Max-Bitrate-UL]
    [ APN-Aggregate-Max-Bitrate-DL]
    * [ AVP ]
```

Step 403

The first network node 208 sends the first PCC rule R#1 comprising QoS information (e.g., the GBR=x to the second network node 210). This way, the first network node 208 informs the second network node 210 through the use of the PCC rule on the treatment of the service data flow associated with the first phone call that is under PCC control, in accordance with the policy decisions of the first network node 208. If the first network node 208 is the PCRF 208 and the second network node 210 is the PCEF 310, then the R#1 is sent via the Rx interface.

Step 404

The second network node 210 receives the R#1 comprising QoS information, and sets up a bearer 315 for the first phone call in accordance with the information in R#1. The QoS information comprises a GBR=x. The second network node 210 reserve the resources necessary for R#1 upon receipt of the R#1 provisioning including QoS information. In another embodiment, step 404 involves that the second network node 210 modifies an existing bearer so that the GBR is increased with x. This is in case that a bearer 315 with the correct QCI already exists.

Step 405

The IMS 201 receives a second incoming phone call from another device and sends session and media related information associated with the second phone call to the first network node 208. The first phone call is placed on hold or terminated until the second phone call is completed. There can also be switching between the different calls, so the second call does not have to be completed. The IMS 201 may put the first phone call on hold and approves/authorizes the second phone call.

In this example a new call arrives to the device in question, the user of the device is notified on the call waiting and the receiving user decides to put the first call on hold while accepting the second call. The above is performed using SIP signaling on IMS level. When the ongoing call is put on hold, gating for that flow may be enabled (optional but likely). Gating is performed like this: the P-CSCF 301 signals to the PCRF 308 that the flow is active/inactive and consequently the PCRF 308 updates the PCC rule with gate status open/closed and sends it to the PGW/GGSN 310 which closes/opens the gate, i.e. disallowing/allowing forwarding of IP packets for the service data flow pointed to by the PCC rule.

Another example would be that the user involved in the first call puts the first call on hold and then initiates a second call to another user.

Step 406

The first network node 208 creates a second PCC rule, R#2, for the second phone call based on the information received in step 405. This also involves determining the GBR for the second phone call, e.g., GBR=y, where y is any positive integer and different from or equal to x. This is performed separately from R#1. The coordinating of R#1 and R#2 takes place in step 407.

Step 407

The first network node 208 further determines that R#1 and R#2 should share a GBR. The shared GBR is a GBR value for the bearer 315 to provide and is for both uplink and downlink. A prerequisite for determining the shared GBR is that the IMS 201 has informed the first network node 208 that the first phone call and the second phone call belong together. Note that the term "shared" does not refer to that the GBR of the two phone calls should have the same value, but that they should share a GBR. The shared GBR express that the rules shall share the same GBR resource.

When the first network node 208 has determined that a shared GBR should be used, it creates a shared GBR indication in order to indicate the shared GBR to the second network node. The shared GBR indication may be an attribute value pair(s) (AVP). An AVP is associated with the Diameter protocol and is used to encapsulate protocol-specific data as well as authentication, authorization or accounting information. A sample syntax for a new AVP, i.e. the shared GBR indication may be as follows:

```
Shared-Guaranteed-Bitrate ::=  < AVP Header: XXXX >
    2,*{ Charging-Rule-Name }
    * [ AVP ]
```

In addition to the shared GBR indication, the first network node 208 may also determine a shared MBR and send it to the second network node 210 (not shown in FIG. 4) based on the policies of the first network node 208. The shared MBR is for both the uplink and the downlink. The shared MBR may be determined by using one of the following two equations:

$$\text{shared MBR} \geq \max(x+\Delta, y+\delta)$$

$$\text{shared MBR} \leq (x+\Delta+y+\delta)$$

x and y are the GBR for the first and second phone call as mentioned above. $\Delta$ and $\delta$ are any positive integer. The shared MBR is limited by the specified values. The lower limit can be applied if gating or the IMS can be trusted so that only one media flows at a time. The upper limit may be applied if sufficient control is not possible, e.g., because of mutual exclusion.

The mode where all gates may be open can be useful. The gates refer to the gating functionality in the second network node 210 (e.g. PGW/GGSN). The gate may have a gate status. A closed gate prevents traffic from passing. The IMS 201 can set the flow to be inactive, which leads to the PCRF 308 closing the gate in the corresponding rule. However, the likelihood that there is a substantial amount of traffic that exceeds the authorized shared GBR increases drastically. By that, the flows are more likely to be subject to packet losses that makes the flow useless. In order to assist the endpoints to adapt to the situation more quickly, it may be suitable to impose the shared MBR for all of the rules in the list. This may be arranged by either adding a "shared MBR police mode" or an explicit MBR value for shared policing.

```
Shared-Guaranteed-Bitrate ::=  < AVP Header: XXXX >
    2,*{ Charging-Rule-Name }
       [ MBR-Police-Mode ]
       [ Max-Requested-Bandwidth-UL ]
       [ Max-Requested-Bandwidth-DL ]
    * [ AVP ]
```

MBR-Police-Mode may be for example to either items:
1) Use the sum of the Max-Requested-Bandwidth-UL/DL values from the rules listed;
2) Use a fraction of the sum of the Max-Requested-Bandwidth-UL/DL values from the rules listed;
3) Use the max value from the Max-Requested-Bandwidth-UL/DL values in the rules listed; or
4) Use explicit Max-Requested-Bandwidth-UL/DL values from the Shared-Guaranteed-Bitrate AVP Item 1) may be used in case gating cannot be sufficiently controlled. Item 3) may be used when gating can be sufficiently controlled. Items 2) and 4) may be used in any case. The above MBR police modes are only examples. Any other modes are also applicable.

Step 408

The first network node 208 sends R#2 together with GBR=y to the second network node 210. In addition, the first network node 208 sends an instruction to combine R#1 and R#2 to the second network node 210 using the shared GBR AVP. Each rule comprises its own standalone GBR. The second network node 210 determines what the GBR should be for the bearer 315. In some embodiments, the shared MBR is also transmitted to the second network node 210 together with R#2 and the shared GBR instructions. This way, the first network node 208 informs the second network node 210 on the treatment of the service data flow associated with the second phone call that is under PCC control, in accordance with the policy decisions of the first network node 208. If the first network node 208 is the PCRF 308 and the second network node 210 is the PCEF 310, then R#2 and the shared GBR instruction are sent via the Gx interface.

Augmenting the PCC framework described in step 402 with a shared GBR, the GBR resource sharing instructs the second network node 210 to use the highest GBR value that appears in any of the listed rules for admission control. That shared GBR allocation is to be shared among the PCC rules listed.

Note that R#1 is already sent in step 403. The first network node 208 only transmits the R#1 in case the gate is going to be closed. In such case, it is only a modification of R#1 that is transmitted, not the complete R#1.

Step 409

The second network node 210 receives the R#2 and the instruction to combine the rules and use the shared GBR. This way, the second network node 210 knows that R#1 and R#2 should be treated with a shared GBR. The presence of the shared GBR indication indicates to the second network node 210 that resource sharing is requested. The second network node 210 determines the shared GBR by selecting the maximum of x and y:

$$\text{shared GBR} = \max(x,y)$$

The second network node 210 modifies the bearer 315 created for the first call to this shared GBR, i.e., it sets up a bearer 315 with a GBR=shared GBR that should be shared among R#1 and R#2. The second network node 210 reserve the radio resources necessary for the GBR=shared GBR to be shared by R#1 and R#2 upon receipt of the R#2 provisioning which includes QoS information. One and only one of the phone calls generate traffic that is let through the second network node 210 at any point in time. This applies to when gating is handled correctly.

The first phone call which is on hold or wait has not any dedicated reserved radio resources while the second phone call is active. The first and second phone call shares the same resources, supported by the shared GBR.

Each PCC rule has its own Allocation and Retention Priority (ARP). ARP comprises information about the priority level, the pre-emption capability and the pre-emption vulnerability. The purpose of the ARP is to decide whether a bearer establishment/modification request may be accepted or needs to be rejected in case of resource limitations. The priority level information of the ARP is used for this decision to ensure that the request of the bearer 315 with the higher priority level is preferred. In the current standard, when two PCC rules have different ARPs, two different bearers are allocated. However, in the embodiments herein, when two PCC rules sharing a resource and have different ARPs, the second network node 210 may depend on a configuration that selects the ARP with highest priority to be a shared ARP.

A prerequisite for the shared ARP is that the QCI for R#1 and R2 is the same. With a shared ARP, the resources may be reused as the same bearer 315 and can be shared for the two calls. The second network node 210 amends the bearer ARP to be the common ARP as determined above, if necessary. If there is no shared ARP and the ARP differs for the two calls, there will be separate bearers for each call and resources cannot be shared.

QCI is short for Qos Class Identifier and is used as a reference to a specific packet forwarding behavior (e.g. packet loss rate, packet delay budget). This may be implemented in the access network by the QCI referencing node specific parameters that control packet forwarding treatment (e.g., scheduling weights, admission thresholds, queue management thresholds, link layer protocol configuration, etc.), that have been pre-configured by the operator at a specific node(s) (e.g. eNodeB).

There may be a difference in the ARP between rules that share the same resource, e.g. when one media is an ordinary service and one is a priority service, such as a Multimedia Priority Service (MPS) call. Procedures specified by 3GPP cater for amendment of the ARP for related bearers, such as the dedicated IM CN signaling bearer and the default bearer.

It should be considered normal that the application layer provides information over Rx to ensure that only one of the rules has the gate open at any point in time. As an alternative, the second network node 210 may be adaptive, e.g., only let the most active flow pass.

Note that the removal of all but one PCC rule with their Charging-Rule-Name values in a list also deletes the list. Since there is just one rule left, there is no reason for maintaining the situation with GBR sharing, i.e., using the shared GBR. When the use of the shared GBR ends, a re-establishment is performed. This is performed when necessary if any of the flows are modified.

An effect of the shared GBR is that the maximum value for the GBR-UL and GBR-DL among the listed rules will be used for resource reservation (admission control). Another effect is that the highest allocation/retention priority (ARP) among the rules listed in the shared GBR will be used for the bearer 315.

All other aspects of the PCC rules are handled as per normal procedures, including maximum bitrates, ARP, data controlling the charging and reporting etc.

Table 2 lists the information contained in a PCC rule, including the information name, the description and whether the first network node 208 may modify this information in a dynamic PCC rule which is active in the second network node 210. The Category field indicates if a certain piece of information is mandatory or not for the construction of a PCC rule, i.e., if it is possible to construct a PCC rule without it.

TABLE 2

| Information name | Description | Category | PCRF permitted to modify for a dynamic PCC rule in the PCEF |
| --- | --- | --- | --- |
| Rule identifier | Uniquely identifies the PCC rule, within an IP-CAN session. It is used between PCRF and PCEF for referencing PCC rules. | Mandatory | no |
| Service data flow detection | This clause defines the method for detecting packets belonging to a service data flow. | | |
| Precedence | Determines the order, in which the service data flow templates are applied at service data flow detection. | Mandatory | yes |
| Service data flow template | A list of service data flow filters for the detection of the service data flow. | Mandatory | yes |
| Charging | This clause defines identities and instructions for charging and accounting that is required for an access point where flow based charging is configured | | |
| Charging key | The charging system (OCS or OFCS) uses the charging key to determine the tariff to apply for the service data flow. | | yes |
| Service identifier | The identity of the service or service component the service data flow in a rule relates to. | | yes |
| Sponsor Identifier | An identifier, provided from the AF which identifies the Sponsor, used for sponsored flows to correlate measurements from different users for accounting purposes. | Conditional (NOTE 6) | yes |
| Application Service Provider Identifier | An identifier, provided from the AF which identifies the Application Service Provider, used for sponsored flows to correlate measurements from different users for accounting purposes. | Conditional (NOTE 6) | yes |
| Charging method | Indicates the required charging method for the PCC rule. Values: online, offline or neither. | Conditional (NOTE 4) | no |
| Measurement method | Indicates whether the service data flow data volume, duration, combined volume/duration or event shall be measured. This is applicable for reporting, if the charging method is online or offline. | | yes |

TABLE 2-continued

| Information name | Description | Category | PCRF permitted to modify for a dynamic PCC rule in the PCEF |
|---|---|---|---|
| Application Function Record Information | Note: Event based charging is only applicable to pre-defined PCC rules. An identifier, provided from the AF, correlating the measurement for the Charging key/Service identifier values in this PCC rule with application level reports. | | no |
| Service identifier level reporting | Indicates that separate usage reports shall be generated for this Service identifier. Values: mandated or not required | | Yes |
| Policy control | This clause defines how the PCEF shall apply policy control for the service data flow. | | |
| Gate status | The gate status indicates whether the service data flow, detected by the service data flow template, may pass (Gate is open) or shall be discarded (Gate is closed) at the PCEF. | | Yes |
| QoS class identifier | Identifier for the authorized QoS parameters for the service data flow. Values: see NOTE 1. | Conditional (NOTE 2) | Yes |
| UL-maximum bitrate | The uplink maximum bitrate authorized for the service data flow | Conditional (NOTE 3) | Yes |
| DL-maximum bitrate | The downlink maximum bitrate authorized for the service data flow | Conditional (NOTE 3) | Yes |
| UL-guaranteed bitrate | The uplink guaranteed bitrate authorized for the service data flow | | Yes |
| DL-guaranteed bitrate | The downlink guaranteed bitrate authorized for the service data flow | | Yes |
| ARP | The Allocation and Retention Priority for the service data flow consisting of the priority level, the pre-emption capability and the pre-emption vulnerability | Conditional (NOTE 5) | Yes |
| PS to CS session continuity | Indicates whether the service data flow is a candidate for vSRVCC. | Conditional | No |
| Access Network Information Reporting | This clause describes access network information to be reported for the PCC rule when the corresponding bearer is established, modified or terminated. | | |
| User Location Report | The serving cell of the UE is to be reported. | | Yes |
| UE Timezone Report | The time zone of the UE is to be reported. | | Yes |
| Usage Monitoring Control | This clause describes identities required for Usage Monitoring Control. | | |
| Monitoring key | The PCRF uses the monitoring key to group services that share a common allowed usage. | | Yes |

NOTE 1:
The QoS class identifier is scalar and accommodates the need for differentiating QoS in all types of 3GPP IP-CAN. The value range is expandable to accommodate additional types of IP-CAN.
NOTE 2:
The QoS class identifier is mandatory when the bearer binding is allocated to the PCEF.
NOTE 3:
Mandatory when policy control on SDF level applies.
NOTE 4:
Mandatory if there is no default charging method for the IP-CAN session.
NOTE 5:
Mandatory when policy control on SDF level applies unless otherwise stated in an access-specific Annex.
NOTE 6:
Applicable for sponsored data connectivity.

The embodiments herein apply both for a GPRS architecture with a GGSN and an EPC architecture with a PGW. The present PCC rules as defined by 3GPP are reused in full for the resource set-up. The embodiments herein introduce, for the Gx reference point, a QoS co-use information Element that comprises a list of PCC rule identities and optionally information on how to co-use the shared MBR. In order to co-use the shared MBR, all the rules must use the same QoS class identifier (QCI) value. The co-use has the effect that the bearer MBR reservation is shared between the PCC rules listed. The P-CSCF 301 may indicate to the PCRF 308 in the media description that the flow shall be active or not, i.e. the gate in the PGW/GGSN 310 shall be open or closed. Essentially gating in PGW/GGSN 310 indicates that no packets are forwarded for that flow.

Figure 1:
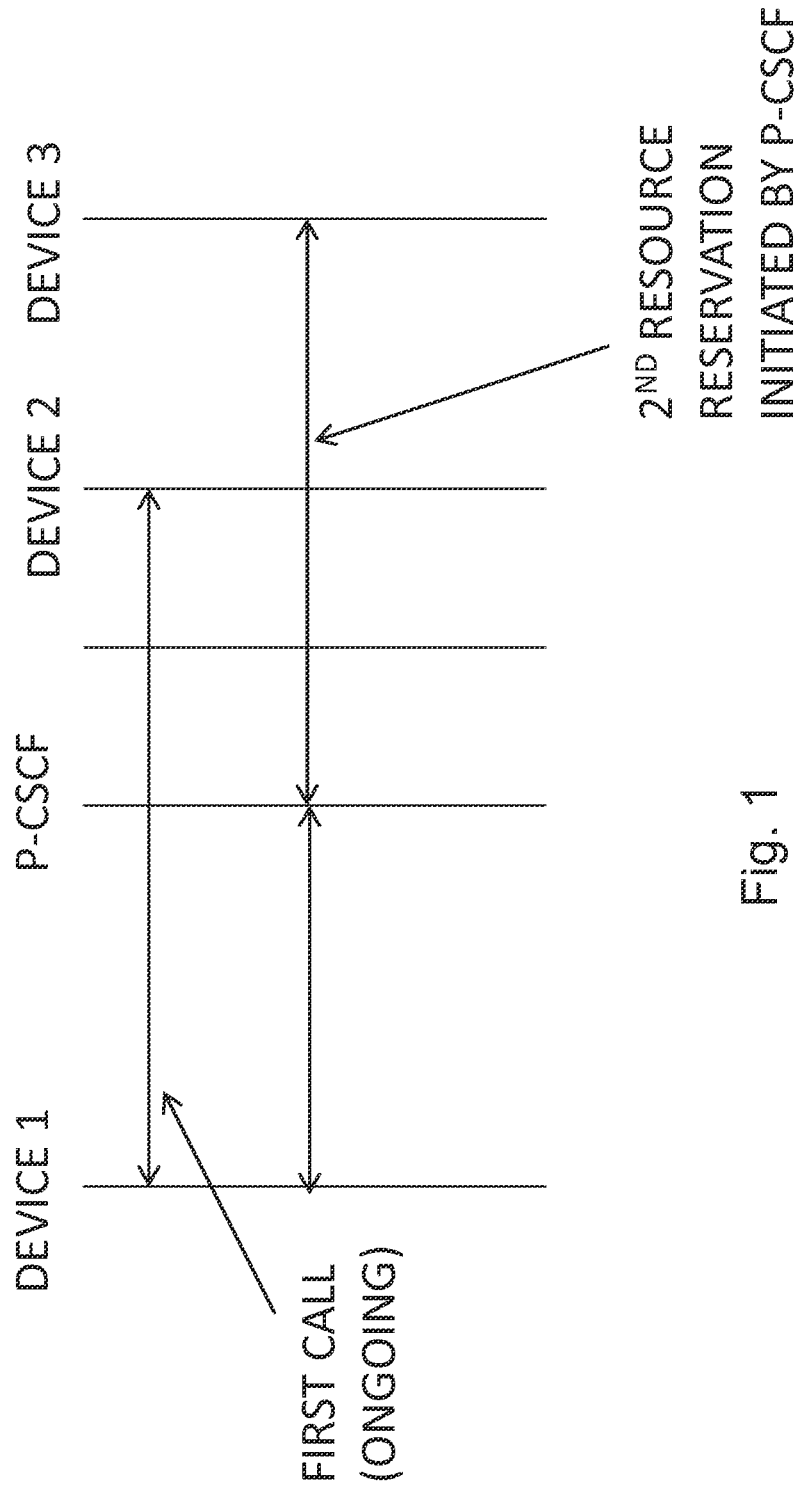
FIG. 1 is an example signaling diagram illustrating embodiments of a method.
Figure 5:
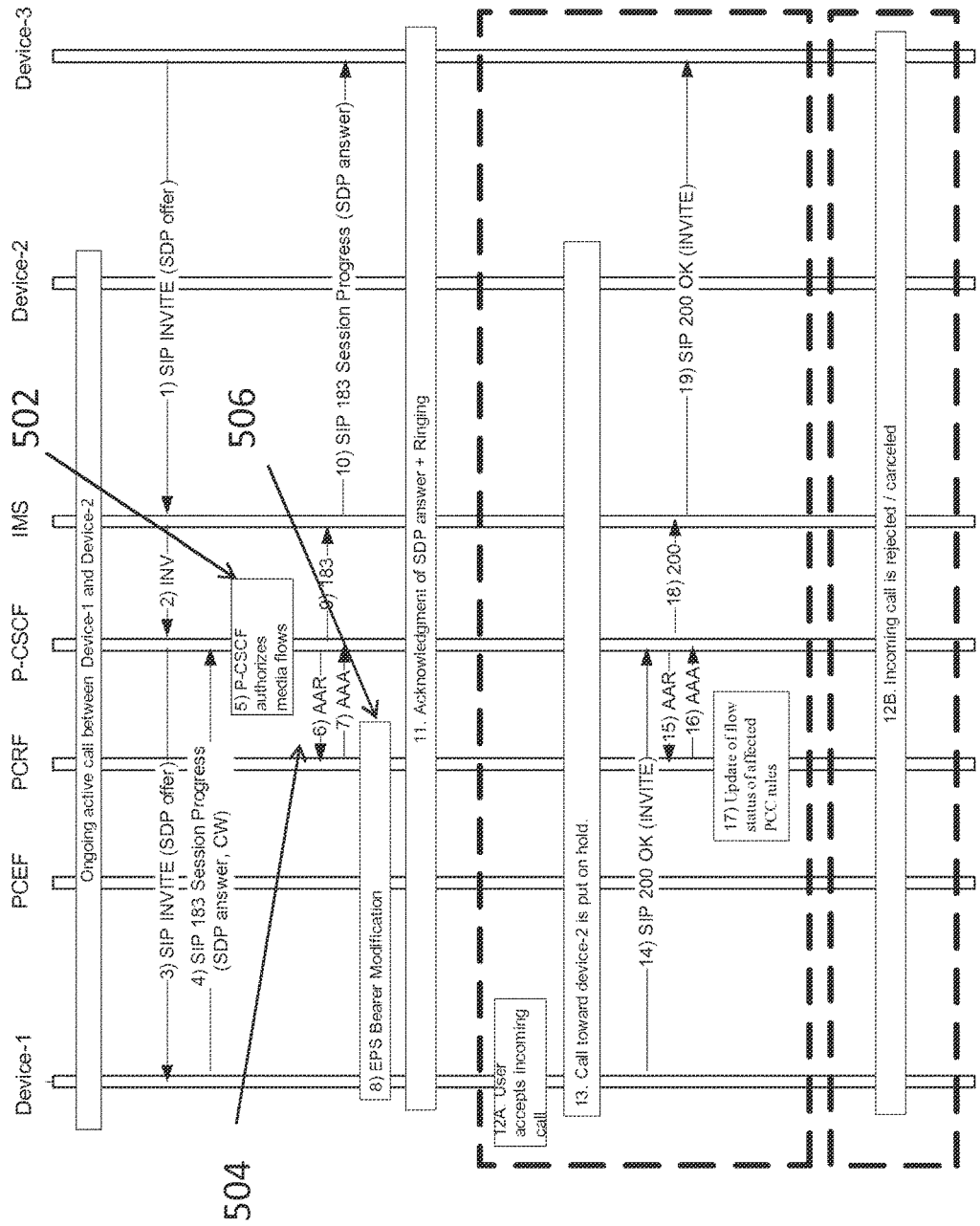
FIG. 5 is an example signaling diagram illustrating embodiments of a method in a communications network.

FIG. 5 is a signaling diagram illustrating embodiments of a method in the communications network 200, in general. QCI-1 bearer with resources for a first call is reserved, as in FIG. 1. A second resource reservation is done from P-CSCF 301 when the next call is setup. PCRF 308 correlates this with previous request. The modification request from PCRF 308 will use same "Charging-Rule-Name AVP" to update the existing reserved resources. The end result is that resources are reserved only for one session (e.g., the most demanding)

Accordingly, a QCI-1 bearer with resources for first call is reserved. A second resource reservation is done from P-CSCF 301. P-CSCF 301 will add the common GBR indicator in the Rx request to indicate that it can reuse resources. Thus, this will be a new Rx session. Based on the common GBR indicator, PCRF 308 will reuse existing resource request and make sure it is upgraded to support the Maximum Bit Rate from the Rx request. The modification request from PCRF will use the same "Charging-Rule-Name AVP" to update the existing reserved resources. The common GBR indicator tells PCRF 308 that it should reuse any existing resource request for the user that is already there and still needs maximum resources required for the two resources.

The embodiments herein relates to IMS. The same principles may be used for call on hold and conferencing (which is just re-using call hold procedures). A common GBR indicator (reused from Rx) will be sent from P-CSCF 301 for call waiting reservations and for Call Hold (but not for active calls). The common GBR indicator tells PCRF 301 that it should reuse any existing resource request for the user that already is there. Only one Active voice/video session will exist when common GBR indicator is sent (could be tied to Application Identifier). It is further assumed that there is not more than one active session. The PCRF 308 will perform session binding based on the UE IP address (and additional identifier) received over Rx. After session binding, PCRF 308 will find the existing Rx session to be reused for the user and particular service.

Figure 6:
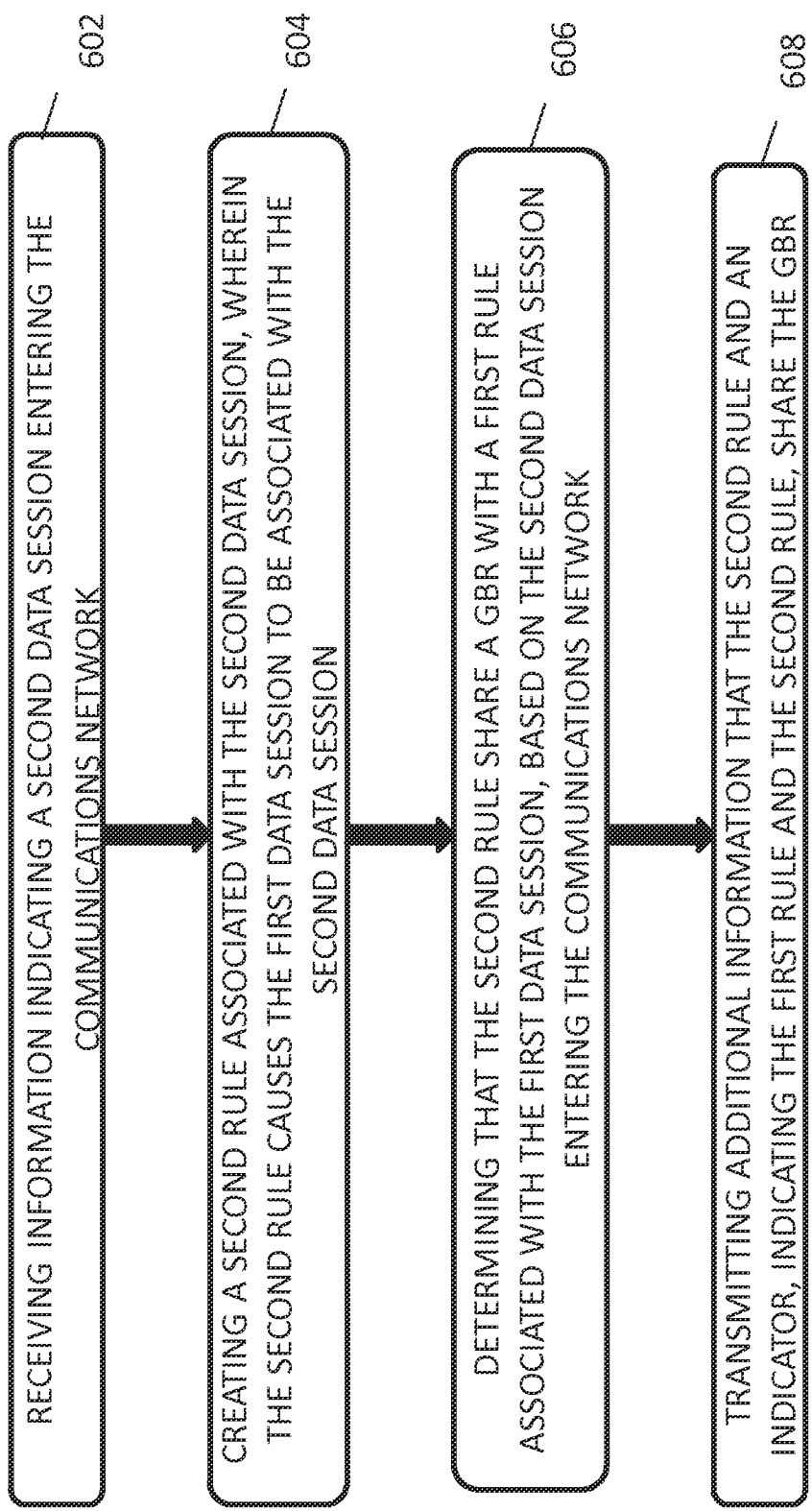
FIG. 6 is an example flow diagram illustrating embodiments of a method in a communications network.

FIG. 6 is an example flow diagram illustrating embodiments of a method in a communications network. In embodiments, FIG. 6 shows an example flow associated with a method performed by a first network that handles data sessions in a communications network. In embodiments, the first data session is on-going in the communications network. At step 602, the first network node receives information indicating a second data session entering the communications network. At step 604, the first node creates a second rule associated with the second data session. In embodiments, the second rule causes the first data session to be associated with the second data session. At step 606, the first node determines that the second rule share a GBR with a first rule associated with the first data session, based on the second data session entering the communications network. At step 608, the first node transmits first information that the second rule and an indicator, indicating the first rule and the second rule, share the GBR.

Figure 7:
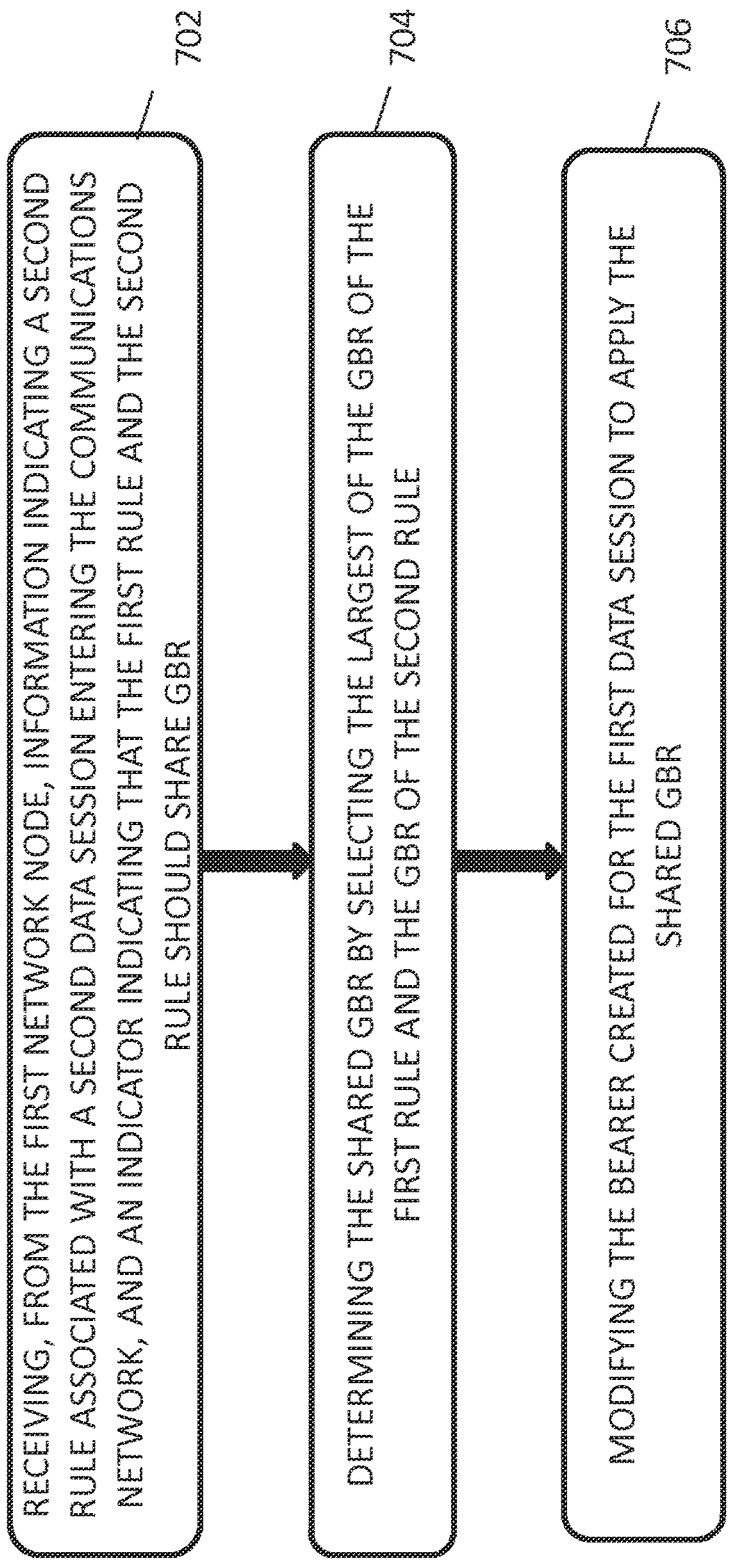
FIG. 7 is an example flow diagram illustrating embodiments of a method in a communications network.

FIG. 7 is an example flow diagram illustrating embodiments of a method in a communications network. In embodiments, FIG. 7 shows an example flow associated with a method performed by a second network node that handles data sessions in a communications network. In embodiments, a first data session, associated with a first rule, is on-going in the communications network; and the second network node creates a bearer for the first data session. At step 702, the second network node receives, from the first network node, information indicating a second rule associated with a second data session entering the communications network; and an indicator indicating that the first rule and the second rule should share GBR. At step 704, the second network node determines the shared GBR by selecting the largest of the GBR of the first rule and the GBR of the second rule. At step 706, the second network node modifies the bearer created for the first data session to apply the shared GBR.

Figure 8:
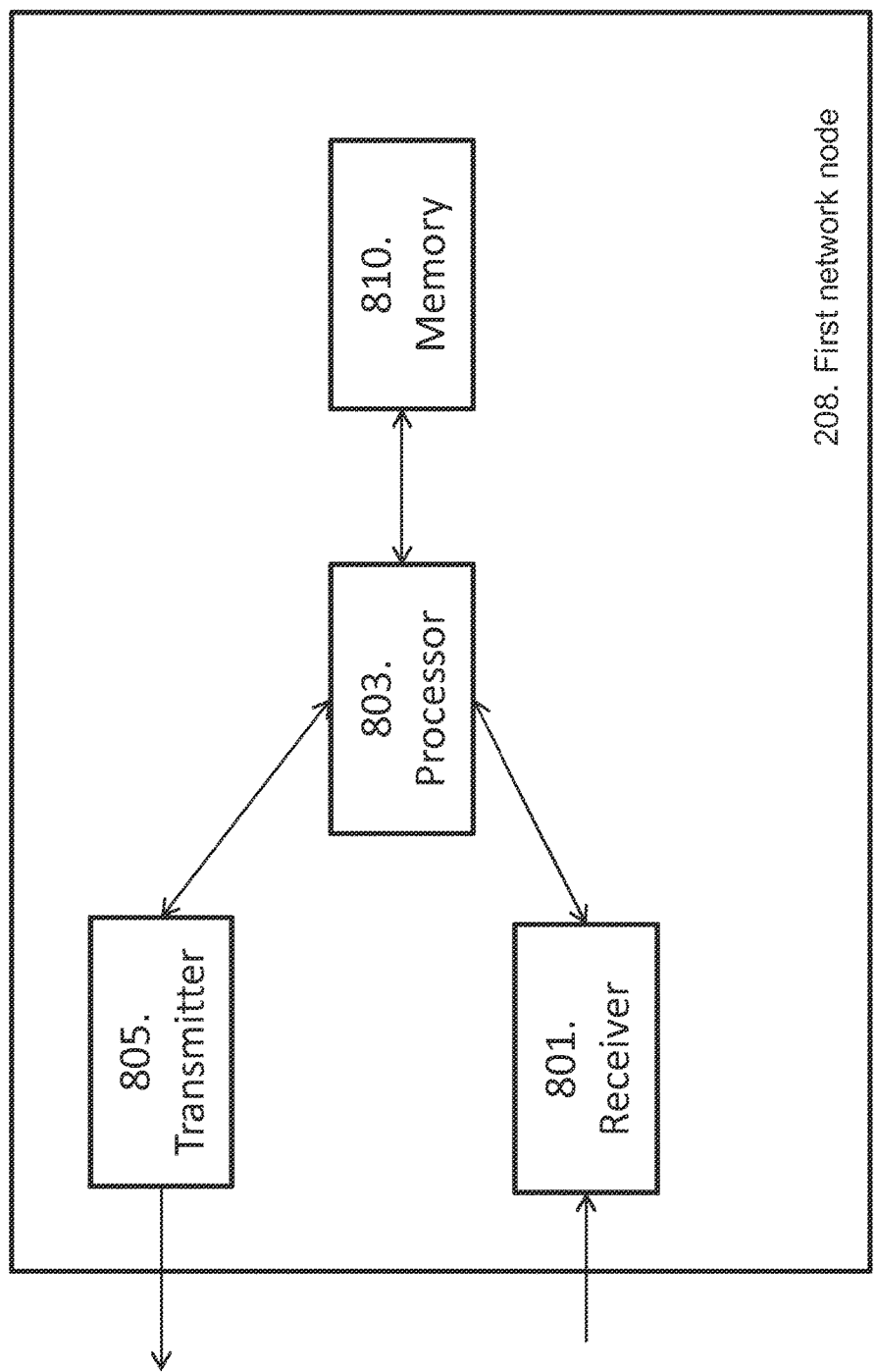
FIG. 8 is an example apparatus illustrating embodiments of a method in a communications network.

To perform the method steps shown in FIGS. 3-7, the first network node 208 comprises an arrangement as shown in FIG. 8. The first network node 208 comprises a receiver 801 adapted to receive a second phone call from the IMS 201. The first network node 208 comprises a processor 803 adapted to create R#2 and to determine that R#1 and R#2 shall share GBR. The processor 803 is further adapted to create the shared GBR indicator which indicates that R#1 and R#2 shall share GBR. The first network node 208 further comprises a transmitter 805 which is adapted to transmit R#2 together with the shared GBR indicator to the second network node 210. The first network node 208 comprises a memory 810 comprising one or more memory units. The memory 810 is arranged to be used to store data, received data streams, power level measurements, messages, the shared GBR indicator, R#1, R#2, threshold values, time periods, configurations, schedulings, and applications to perform the methods herein when being executed in the first network node 208.

Those skilled in the art will also appreciate that the receiver 801 and the transmitter 805 described above may refer to a combination of analog and digital circuits, and/or one or more processors configured with software and/or firmware, e.g. stored in a memory, that when executed by the one or more processors such as the processor 803 perform as described above.

Figure 9:
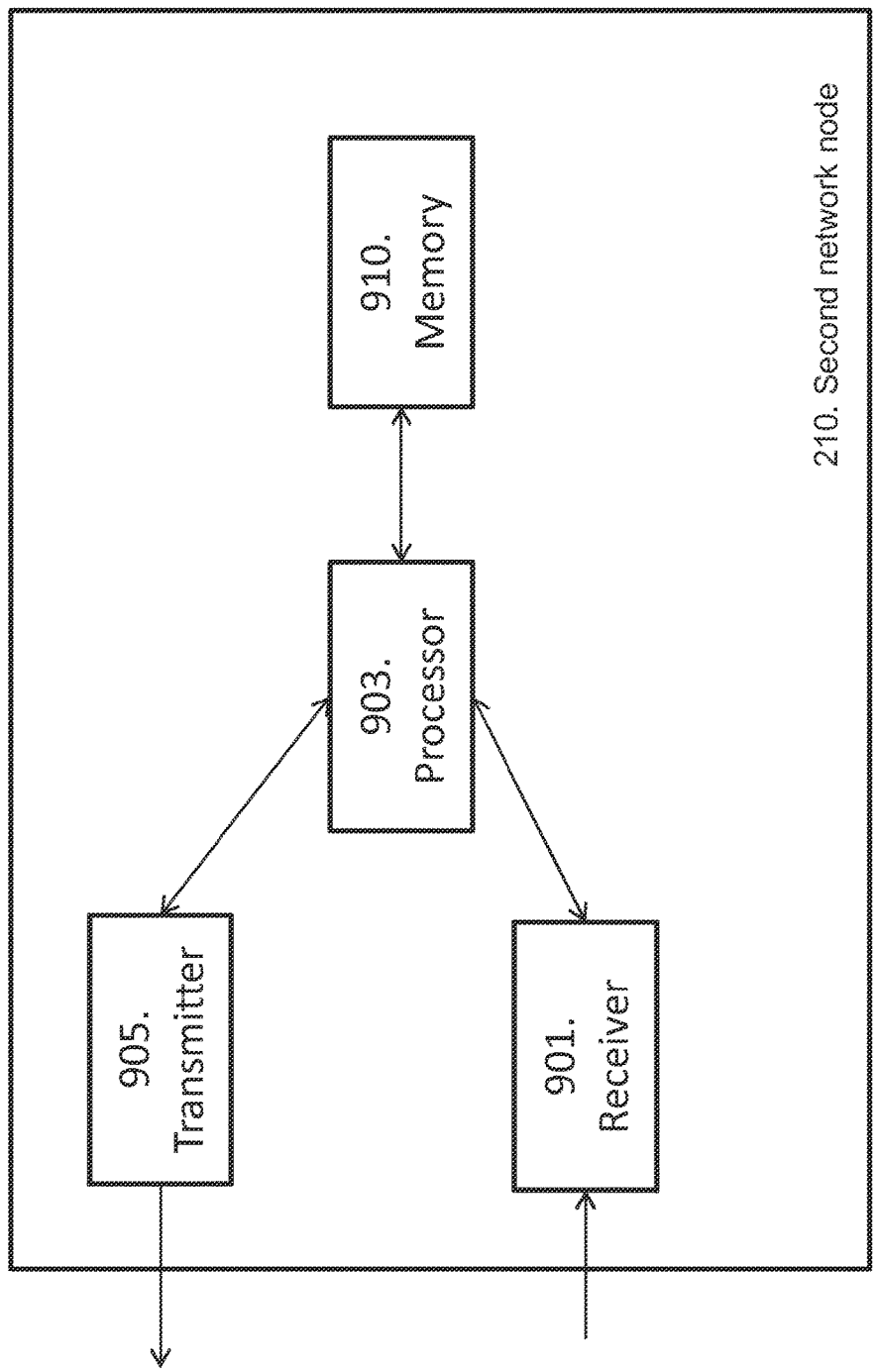
FIG. 9 is an example apparatus illustrating embodiments of a method in a communications network.

To perform the method steps shown in FIG. 3-7 the second network node 210 comprises an arrangement as shown in FIG. 9. The second network node 210 comprises a receiver 901 adapted to receive R#2 and the shared GBR indicator from the first network node 208. The second network node 210 further comprise a processor 903 adapted to interpret the shared GBR indicator, determine the shared GBR=max(x,y) and modify the bearer created for the first call to this shared GBR. The second network node 210 comprises a transmitter 905 which is adapted to transmit messages to other nodes in the network. The second network node 210 comprises a memory 910 comprising one or more memory units. The memory 910 is arranged to be used to store data, received data streams, power level measurements, messages, indicators, cause codes, threshold values, time periods, configurations, schedulings, and applications to perform the methods herein when being executed in the second network node 210.

Those skilled in the art will also appreciate that the receiver 901 and the transmitter 905 described above may refer to a combination of analog and digital circuits, and/or one or more processors configured with software and/or firmware, e.g. stored in a memory, that when executed by the one or more processors such as the processor 910 perform as described above.

The method described above may be implemented through one or more processors, such as a processor 803 in the first network node arrangement and a processor 903 in the second network node arrangement as depicted in FIG. 5, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the first network node 208 and/or the second network node 210. One such carrier may be in the form of a CD ROM disc. It is however feasible with other data carriers such as a memory stick. The computer program code can furthermore be provided as pure program code on a server and downloaded to the first network node 208 and/or the second network node 210.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear.

What is claimed is:

1. A method in a first network node that handles calls in a communications network, wherein a first call is on-going in the communications network and the first call is between a first party and a second party, the method comprising:
   receiving information associated with a second call entering the communications network, wherein the second call is between the first party and one of the second party and a third party;
   determining whether the information associated with the second call indicates that the first call and the second call are mutually exclusive such that while one of the calls is active the other call is inactive; and
   as a result of determining that the information associated with the second call indicates that the first call and the second call are mutually exclusive, transmitting to a second network node first information indicating that the first call and the second call should share guaranteed bit rate (GBR) resources;
   determining a shared maximum bit rate (MBR) to be shared between the first call and the second call; and
   transmitting second information indicating the shared MBR to the second network node,
   wherein the shared MBR is determined by:

$$\text{shared MBR} \geq \max(x+\Delta, y+\delta)$$

wherein x and y are the GBR for the first call and the second call, and $\Delta$ and $\delta$ are integer values.

2. The method of claim 1, wherein the first call and the second call use the same quality of service class identifier (QCI) values.

3. The method of claim 1, wherein the shared MBR is imposed on the first call and the second call and includes adding a shared MBR police mode that includes at least one of:
   using a sum of a maximum-requested-bandwidth-upload or download values from listed rules;
   using a fraction of the sum of the maximum-requested-bandwidth-upload or download values from the listed rules; and
   using the maximum value from the maximum-requested-bandwidth-upload or download values in the listed rules.

4. The method of claim 1, wherein the information associated with the second call is an attribute value pairs (AVP) and includes identifiers associated with the first call and the second call.

5. The method of claim 1, wherein the GBR is: GBR=maximum (GBR for the first call, GBR for the second call).

6. The method of claim 1, further comprising determining that a gating operation is available to ensure that only one of the first call and the second call is active at a given time; and
   in response to determining that the gating operation is available, defining the shared MBR by determining a minimum value.

7. The method of claim 1, further comprising determining that a gating operation is not available; and
   in response to determining that the gating operation is not available, defining the shared MBR by determining a maximum value.

8. A first network node comprising:
   a processor; and
   a computer readable medium coupled to the processor, said computer readable medium containing instructions executable by the processor, whereby the first network node handles calls in a communications network, wherein a first call is on-going in the communications network and the first call is between a first party and a second party, and the first network node is operative to:
   receive information associated with a second call entering the communication network, wherein the second call is between the first party and one of the second party and a third party;
   determine whether the information associated with the second call indicates that the first call and the second call are mutually exclusive such that while one of the calls is active the other call is inactive; and
   as a result of determining that the information associated with the second call indicates that the first call and the second call are mutually exclusive, transmit to a second network node first information indicating that the first call and the second call should share guaranteed bit rate (GBR) resources;
   determine a shared maximum bit rate (MBR) to be shared between the first call and the second call; and
   transmit second information indicating the shared MBR to the second network node,
   wherein the shared MBR is determined by:

$$\text{shared MBR} \geq \max(x+\Delta, y+\delta)$$

wherein x and y are the GBR for the first call and the second call, and A and 6 are integer values.

9. The first network node of claim 8, wherein the shared MBR includes a shared MBR police mode that uses a sum of maximum requested bandwidth for upload or download values.

10. The first network node of claim 9, wherein the shared MBR police mode is used when gating is not controlled.

11. The first network node of claim 8, wherein the shared MBR includes a shared MBR police mode that uses a fraction of the sum of maximum requested bandwidth for upload or download values.

12. The first network node of claim 11, wherein the shared MBR police mode is used when gating is controlled.

* * * * *